(Model.)
J. BOWES.
ICE APPARATUS.
No. 278,085. Patented May 22, 1883.
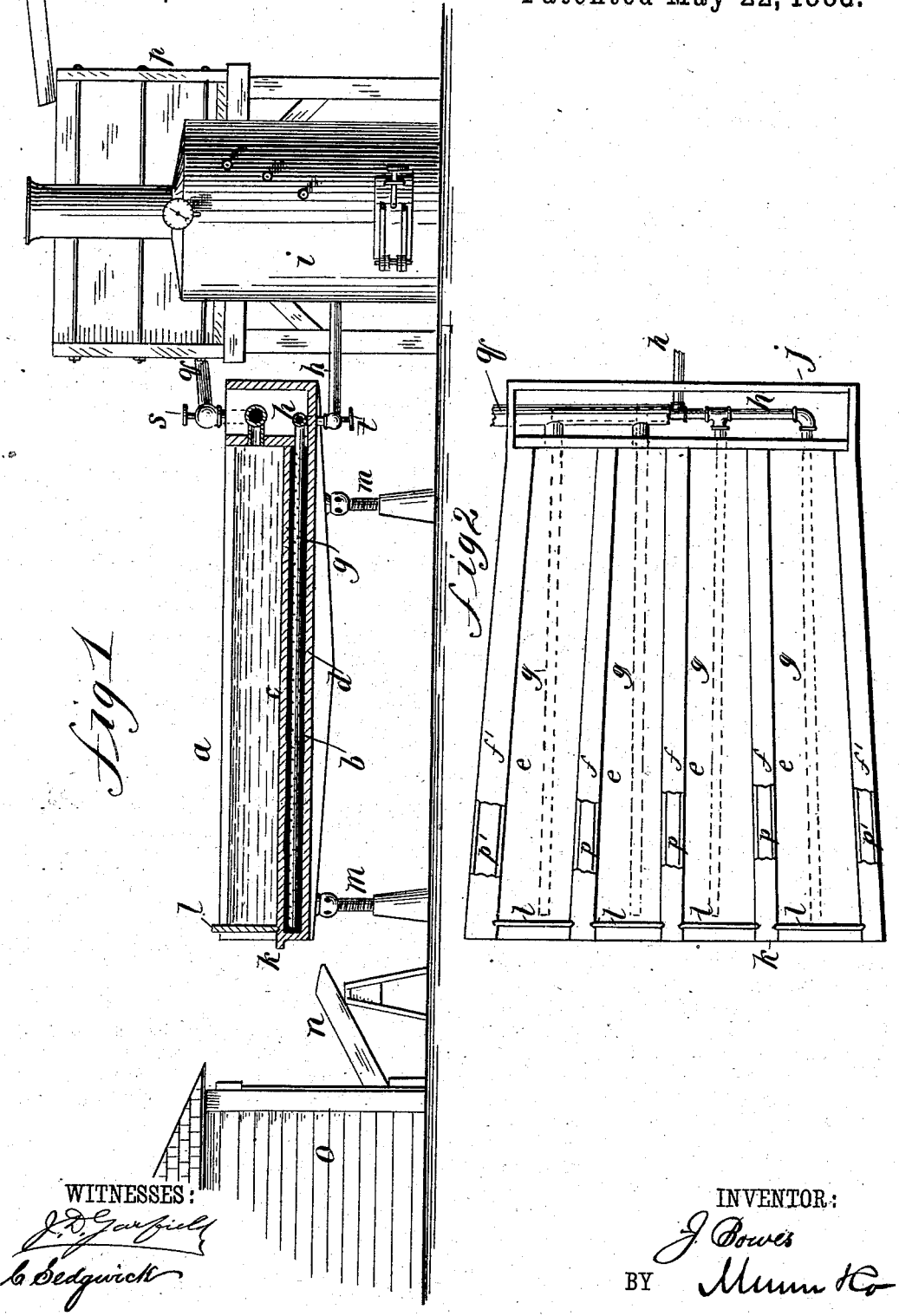
WITNESSES:
INVENTOR:
J. Bowes
BY Munn & Co
ATTORNEYS.

UNITED STATES PATENT OFFICE.

JOHN BOWES, OF HALIFAX, NOVA SCOTIA, CANADA.

ICE APPARATUS.

SPECIFICATION forming part of Letters Patent No. 278,085, dated May 22, 1883.

Application filed March 16, 1883. (Model.)

*To all whom it may concern:*

Be it known that I, JOHN BOWES, of Halifax, Nova Scotia, Canada, have invented a new and Improved Ice Apparatus, of which the following is a full, clear, and exact description.

My invention consists of apparatus for freezing water by supplying it to shallow pans to be frozen by natural cold, steam apparatus for thawing the frozen cakes free from the bottoms and sides of the pans, and apparatus for tilting up the pans to facilitate the discharge of the frozen cakes into the ice-house, all as hereinafter fully described.

Reference is to be had to the accompanying drawings, forming part of this specification, in which similar letters of reference indicate corresponding parts in both figures.

Figure 1 represents a sectional elevation of the freezing-pan and thawing apparatus, and side elevation of the supply-tank for the water and of the steam-boiler and the ice-house; and Fig. 2 is a plan view of the freezing-pan, parts being broken away.

I propose to employ a freezing-pan, $a$, of suitable dimensions, having a heating-space, $b$, in the bottom $c\ d$, and being separated into spaces $e$, of approved width, by partitions $f$, also having steam-tight spaces $p$, in which steam may circulate under the bottom and up the sides of the cake of ice to be frozen in said pans. The sides $f'$ of the pan are also to have spaces $p'$ for the steam, which is to be delivered into the bottom space, $b$, from perforated pipes $g$, connected with a main pipe, $h$, to be supplied from a boiler, $i$, of any approved kind. The spaces $e$ are to be a little flaring from the head $j$ of the pan to the discharging end $k$, where end gates, $l$, are fitted suitably for being removed when the ice is to be discharged. The pan is to be set on screw-jacks $m$, or other means of raising the head and lowering the other end, and the pipe-connections are to be detachable, or so fitted that the pan may be tilted without disconnecting them to facilitate the discharge of the frozen cakes into the chute $n$ for delivery into the storehouse $o$ when thawed free by the steam. For the supply of the water a frost-proof reservoir, $p$, may be employed to receive the water from a flowing stream or a pump, and it may have filtering attachments for purifying the water before delivery to the freezing-pan for securing pure ice. The water will be discharged from the reservoir $p$ into the pan through a pipe, $q$, having a stop-valve, $s$, to be closed when the pan is filled, and the steam-pipe $h$ will have a stop-valve, $t$, for shutting off the steam while the water is freezing in the pans. The chamber $b$ will have a suitable waste-cock or trap for the escape of the water of condensation.

It will be seen that with this simple contrivance ice may be manufactured in large or small quantities, and be delivered into the ice-house with but very little care and labor and at much less expense than it can be cut and hauled from the natural sources of supply, and it may be had in much purer quality.

Having thus described my invention, I claim as new and desire to secure by Letters Patent—

1. The improved freezing-pan having chambered bottom $b$, partitions $f$, and sides $f'$, and being provided with perforated steam-distributing pipes $g$, connected with a steam-boiler, substantially as described.

2. The improved freezing-pan having flaring ice-spaces $e$, the sides and bottom of which are surrounded by a steam-jacket, and having a removable gate at the wide end, substantially as described.

3. The improved freezing-pan having flaring ice-spaces $e$, surrounded at the bottom and sides with a steam-jacket, also having removable end gates, and being arranged on adjustable supports, enabling it to be inclined for the discharge of the ice-cakes, substantially as described.

4. The combination, in an ice apparatus, of the freezing-pan having spaces $e$, with steam-jacketed sides and bottom, the water-supply tank, boiler, and perforated distributing-pipes, substantially as described.

5. The combination of the perforated steam-distributing pipes $g$ with the freezing-pan having spaces $e$, with steam-jacketed bottom and sides, substantially as described.

JOHN BOWES.

Witnesses:
WM. McLERRAN,
ROBIE G. FRYE.